3,282,716
COATING COMPOSITIONS CONTAINING BUTYRIC ACID ESTERS OF CELLULOSE

Charles H. Coney and Robert M. Simons, Kingsport, Tenn., assignors to Eastman Kodak Company, Rochester, N.Y., a corporation of New Jersey
No Drawing. Filed Oct. 17, 1963, Ser. No. 317,069
3 Claims. (Cl. 106—186)

This invention relates to coating compositions and more particularly to fast curing coating compositions.

It is well known to provide coating compositions based on cellulose esters, such as butyric acid esters of cellulose, together with resins such as urea-formaldehyde or melamine formaldehyde resins. Coatings of this type have provided highly satisfactory results when applied to a variety of supports, such as paper, metal, and wood. However, films cast from such compositions generally require several days' drying at room temperature, or baking for a period of time at elevated temperatures to obtain a cured crosslinked coating. It therefore appears desirable to provide coating compositions based on butyric acid esters of cellulose which may be cured rapidly at room temperature.

One object of our invention is to provide coating compositions based on butyric acid esters of cellulose which may be cured rapidly. Another object of our invention is to provide coating compositions comprising butyric acid esters of cellulose which may be crosslinked rapidly at room temperatures. Other objects of our invention will appear herein.

These and other objects of our invention are accomplished with coating compositions comprising butyric acid esters of cellulose which are soluble in ethyl alcohol, ethyl alcohol soluble dimethylol urea and acid catalyst. We have found that coating compositions in accordance with our invention may be applied to a variety of substrates such as paper, metal and wood to give coatings which are converted to crosslinked films at ordinary temperatures in a short period of time, such as one to two hours.

Our invention will be further illustrated by the following examples.

Example 1

A lacquer coating composition was formulated containing the following ingredients:

| Ingredients: | Weight percent |
|---|---|
| Butyric acid ester of cellulose | 15.0 |
| Dimethylol urea | 15.0 |
| p-Toluene sulfonic acid (50% in butanol) | 1.5 |
| 95% anhydrous ethyl alcohol | 54.5 |
| Ethylene glycol monoethyl ether acetate | 14.0 |

The lacquer was formulated by heating together the dimethylol urea, toluene sulfonic acid and ethyl alcohol at about 150°–160° F. until a clear homogeneous solution was obtained. The dimethylol urea employed was prepared in accordance with the method described below. After this solution was prepared, butyric acid ester of cellulose, containing about 55% butyryl, less than 1% acetyl and about 4.5% hydroxyl, was added together with the ethylene glycol monoethyl ether acetate, which functioned to reduce the volatility of the ethyl alcohol. The lacquer was then brushed on wood and air dried for about one hour. The coating was very hard and completely resistant to acetone at that time, showing that crosslinking had occurred.

Example 2

A lacquer coating composition was prepared having the following composition:

| Ingredients: | Weight percent |
|---|---|
| Butyric acid ester of cellulose | 13.5 |
| Dimethylol urea | 13.5 |
| Di(2-ethylhexyl)phthalate | 3.0 |
| p-Toluene sulfonic acid (50% in butanol) | 1.4 |
| 95% anhydrous ethyl alcohol | 54.6 |
| Ethylene glycol monoethyl ether acetate | 14.0 |

The lacquer was prepared in the same manner as described in Example 1, the plasticizer being added together with a butyric acid ester of cellulose, similar to that employed in Example 1. The composition was coated on wood and air dried for about one hour. The resulting coating was hard and completely resistant to acetone, showing that crosslinking had occurred.

The dimethylol urea which we employ in accordance with our invention is soluble in warm ethyl alcohol. We have found that ethyl alcohol soluble dimethylol urea as employed in preparing compositions in accordance with the invention may be advantageously prepared in accordance with the following procedure:

PREPARATION OF DIMETHYLOL UREA

In a 5-liter flask equipped with stirrer, thermometer, and reflux condenser were placed 1360 g. of 37% aqueous formaldehyde (16.8 moles formaldehyde) and 480 g. urea (8 moles). The urea was allowed to dissolve and the solution was brought to a pH of 7–8 with aqueous sodium hydroxide. The solution was buffered with a small amount of monosodium phosphate. The temperature rose to a maximum of approximately 40° C. after stirring for two hours and then slowly fell to room temperature. The thermometer was removed after two hours and stirring continued at room temperature for an additional 15–18 hours. At the end of this time a thick paste had formed. Cold anhydrous ethanol, 1000 ml., was added and the dispersion was stirred vigorously. The dimethylol urea obtained was removed by filtration, washed with several 250 ml. portions of cold anhydrous ethanol, and air-dried for four hours. The powder was then dried in a vacuum desiccator. A yield of 80% of a dimethylol urea soluble in warm ethanol was obtained (M.P. 134°–136° C.).

Ethyl alcohol soluble dimethylol urea is employed in the lacquers of our invention in amounts from 5 to 30%, and preferably about 10 to 20%. The butyric acid esters of cellulose which we employ in our invention are soluble in ethyl alcohol and contain at least 42% butyryl, less than 5% fatty acid radicals of 2–3 carbon atoms, and 3–9% free hydroxyl. The butyric acid ester of cellulose is employed in the coating compositions of the invention in amounts of from 5 to 30%, and preferably from 10 to 20%.

Any suitable acid catalyst may be employed in the lacquers of the invention, such as the catalysts described in U.S. Patent 2,631,138, although it is preferred to use an aryl sulfonic acid, e.g., p-toluene sulfonic acid, sulfoacetic acid monohydrate, methyl, ethyl or propyl sulfonic acids, or a mixed alkane sulfonic acid, such as described in U.S. Patent 2,875,164. Other catalysts which may be employed with satisfactory results include dialkyl acid phosphates such as di-n-butyl acid phosphate. The concentration of the catalyst may be varied over a relatively wide range, concentrations of about 5% based on the non-volatile substituents being quite suitable.

The solvent solution of our invention essentially consists of about 75–100% ethyl alcohol and 0–25% of another solvent, such as a retarder solvent, which is compatible with the ethyl alcohol and the nonvolatile substituents. Preferably, we employ as a retarder solvent ethylene glycol monoethyl ether acetate in amounts of about 10% by weight of the solvent. Any suitable retarder solvent may be used, such as 2-ethyl hexyl acetate, ethylene glycol monomethyl ether, and ethylene glycol monoethyl ether. By "retarder solvent," we refer to a solvent which tends to inhibit evaporation of the ethyl alcohol.

It is to be understood that the lacquer compositions as described above and as defined in the appended claims may have customary modifiers and addenda incorporated therein, including plasticizers, dyes, ultraviolet absorbers, antioxidants, fungicides and the like.

The coatings of our invention are economical, and feature rapid curing at room temperatures. The rapid curing of the coating compositions of our invention is highly advantageous in industry, allowing assembly line procedures to be conducted without long interruptions for the coatings to cure. For example, furniture in accordance with our invention may be sanded within one hour after coating, and paper coated with the compositions of our invention may be stacked or rolled in an even shorter time.

The invention has been described in detail with particular reference to preferred embodiments thereof but it will be understood that variations and modifications can be effected within the spirit and scope of the invention as described hereinabove and as defined in the appended claims.

We claim:

1. A lacquer coating composition consisting esssentially of a clear homogeneous solution of the following ingredients:
    (A) from 5 to 30 percent by weight of an ethyl alcohol soluble butyric acid ester of cellulose,
    (B) from 5 to 30 percent by weight of ethyl alcohol soluble dimethylol urea,
    (C) a minor portion of a catalyst capable of promoting cross-linking between a dimethylol urea and a butyric acid ester of cellulose, and
    (D) the remaining portion being a solvent comprising 75 to 100 percent, by weight of the solvent, of ethyl alcohol and 0 to 25% by weight of the solvent, of a solvent compatible with the above-identified ingredients.

2. A lacquer coating composition as defined by claim 1 wherein each of ingredients (A) and (B) is present in an amount from 10 to 20 percent by weight.

3. A lacquer coating composition as defined by claim 2 wherein ingredient (A) is about 15% of a butyric acid ester of cellulose containing about 55% thereof of butyryl, less than 1% thereof of acetyl and about 4 to 5% thereof of hydroxyl, ingredient (B) is about 15% of said ethyl alcohol soluble dimethylol urea, ingredient (C) is about 1.5% p-toluene sulfonic acid, and ingredient (D) is about 54.5% of anhydrous (95%) ethyl alcohol and about 14% ethylene glycol monoethyl ether acetate.

References Cited by the Examiner

UNITED STATES PATENTS

| | | | |
|---|---|---|---|
| 2,315,745 | 4/1943 | Sorenson | 260—553 |
| 2,324,417 | 7/1943 | Murray et al. | 260—553 |
| 2,883,350 | 4/1959 | Baudecroux et al | 106—189 |
| 2,887,397 | 5/1959 | Johnson et al. | 106—186 |
| 3,097,239 | 7/1963 | Tawney | 260—553 |

OTHER REFERENCES

"Cellulose and Cellulose Derivatives," Ott et al., 2nd ed., part II, vol. 5, 1954, p. 936.

ALEXANDER H. BRODMERKEL *Primary Examiner.*

D. J. ARNOLD, *Assistant Examiner.*